(12) United States Patent
Dall'Agnol et al.

(10) Patent No.: US 10,326,258 B2
(45) Date of Patent: Jun. 18, 2019

(54) VENTILATION AND FIRE EXTINGUISHING DEVICE FOR ELECTRICAL PANELS

(71) Applicant: EVERET DUKLAIR S.R.L., Levico Terme (IT)

(72) Inventors: Guido Dall'Agnol, Marostica (IT); Daniele Bonotto, Molvena (IT); Stefano Bonotto, Marostica (IT)

(73) Assignee: EVERET DUKLAIR S.R.L., Levico Terme (TN) (IT)

(*) Notice: Subject to any disclaimer, the term of this patent is extended or adjusted under 35 U.S.C. 154(b) by 0 days.

(21) Appl. No.: 15/745,702

(22) PCT Filed: Jul. 15, 2016

(86) PCT No.: PCT/IT2016/000176
§ 371 (c)(1),
(2) Date: Jan. 17, 2018

(87) PCT Pub. No.: WO2017/013687
PCT Pub. Date: Jan. 26, 2017

(65) Prior Publication Data
US 2018/0212406 A1 Jul. 26, 2018

(30) Foreign Application Priority Data
Jul. 17, 2015 (IT) .................. 102015000035518

(51) Int. Cl.
*H05K 7/20* (2006.01)
*H02B 1/28* (2006.01)
(Continued)

(52) U.S. Cl.
CPC .............. *H02B 1/28* (2013.01); *H02B 1/46* (2013.01); *H02B 1/56* (2013.01)

(58) Field of Classification Search
None
See application file for complete search history.

(56) References Cited

U.S. PATENT DOCUMENTS

| 6,407,331 B1 | 6/2002 | Smith |
| 7,262,964 B1 * | 8/2007 | Barsun ............... H05K 7/20154 165/104.33 |

(Continued)

FOREIGN PATENT DOCUMENTS

| EP | 2722947 A1 | 4/2014 |
| JP | 2009201274 A | 9/2009 |

(Continued)

OTHER PUBLICATIONS

Italian Patent Office Search Report and Written Opinion dated Mar. 1, 2016 (partially in English).
(Continued)

*Primary Examiner* — Courtney L Smith
(74) *Attorney, Agent, or Firm* — Hedman & Costigan, P.C.; James V. Costigan; Kathleen A. Costigan

(57) ABSTRACT

A ventilation device for electrical panels, comprising a box-like metallic base (10), which is placed on top of an electrical panel and which has at least one lower opening (11) through which flows an air or heat flow (F) coming from said electrical panel, and at least one sheet or laminar element (12), preferably made of plastic material, placed above said box-like metallic base (10); a flap (13) is obtained in at least one portion of said laminar element (12), so that at least one portion of the perimeter of said flap (13) is made in one piece with said laminar element (12) and constitutes a linear fold (16) of said laminar element (12), suitable to allow said flap (13) raising and lowering with respect to said laminar element (12) for opening and closing a corresponding upper opening (15) of the laminar element (12) which is defined by said flap (13).

9 Claims, 4 Drawing Sheets

(51) Int. Cl.
  *H02B 1/56*    (2006.01)
  *H02B 1/46*    (2006.01)

(56) References Cited

U.S. PATENT DOCUMENTS

| | | | | |
|---|---|---|---|---|
| 7,545,639 B2* | 6/2009 | Ridge | ................. | G11B 23/021 |
| | | | | 109/75 |
| 8,875,534 B2* | 11/2014 | Wu | .................... | H05K 7/20181 |
| | | | | 236/49.1 |
| 9,173,323 B2* | 10/2015 | Liao | .................. | H05K 7/20727 |
| 9,999,161 B2* | 6/2018 | Mease | ................ | H05K 7/20172 |
| 2005/0199845 A1* | 9/2005 | Jones | .................... | F16K 15/031 |
| | | | | 251/129.06 |
| 2011/0159795 A1* | 6/2011 | Sprague | ............. | H05K 7/20181 |
| | | | | 454/184 |

FOREIGN PATENT DOCUMENTS

WO    2011/066563 A2    6/2011
WO    2011/066563 A3    6/2011

OTHER PUBLICATIONS

Notification of Transmittal of the International Search Report and the Written Opinion of the International Searching Authority for PCT/IT2016/000176 dated Dec. 9, 2016.
English Abstract for EP 2722947 A1 dated Apr. 23, 2014.
English Abstract for JP 2009201274 A dated Sep. 3, 2009.

* cited by examiner

VENTILATION AND FIRE EXTINGUISHING DEVICE FOR ELECTRICAL PANELS

The present invention relates to the field of safety devices and, in particular, relates to a ventilation device for electrical switchboards.

In particular, the invention relates to an aeration module configured to replace the classical ventilation grid, which is usually placed on top of the electrical panels; the module is composed of one or more resealable flaps, which allow to realize a closure of the panel by means of the flap in case of an excess of heat, so as to prevent that any fire which may be initiated within the electrical panel is fed and spread outside the panel.

The known solutions, which are provided for preventing an excess of heat and therefore the possible ignition of dangerous fires inside the electrical devices, which can be fed and spread even outside the device, are based, on one hand, on the use of flame retardant additives (which, however, are typically used for electrical appliances, such as coffee machines or ice cream machines) and, on the other hand, on the construction of plastic wrapping, made with flame retardant polymers, in order to make safe electrical switchboards and other devices, such as circuit boards, power supplies, reactors, transformers, etc.

The use of flame-retardant polymers, however, generates high costs, because of the substantial costs of the raw material, which determine, in their turn, a substantial increase of the production costs of the finished product; moreover, their composition is not adapted to the molding operations, making them more difficult to produce, and, finally, it is not possible to reuse waste of their processing, which are then sold with difficulty and at a low price.

Not least, obtaining mandatory certification entails extra costs.

Other known solutions are based on chemical flame retardant substances, which, however, are limited to delaying the propagation of a flame, but not to stop it.

This mainly involves, in case the equipment or the electric panel is located in a non-watched environment, the spreading of the fire without any control.

Inerting gas are also known for stopping the oxidation reactions that occur during combustion, but they also have some serious drawbacks, including the fact that said gases are not compatible with the human presence in the same environment, because they greatly reduce the percentage of oxygen in the environment (the oxygen, in addition to being essential for spreading the flames, is, first of all, vital to humans).

As part of the above mentioned requirements, the main object of the present invention is to overcome the drawbacks of the prior art and, in particular, to provide a ventilation device for electrical panels, which avoids the spreading of any fire inside the electrical panels in an efficient and safety way.

Another object of the invention is to provide a ventilation device for electrical panels, which does not require flame retardant additives.

Another object of the present invention is to provide a ventilation device for electrical panels, which has low production costs with respect to the known devices.

A further object of the invention is to provide a ventilation device for electrical panels, the structure of which is made without the need of huge costs for making special molds, because it is enough to use a special equipment to form a single module, such as a reclosable flap, both on a sheet and on the same box of the electrical panel.

These and other objects, which will be more clear from the following, are obtained according to the invention by means of a ventilation device for electrical panels according to the enclosed claim 1; more detailed technical features are provided in the other dependent claims.

Advantageously, the ventilation device or ventilation module for electrical panels, which is the object of the present invention, replaces the classical top ventilation grid of the electrical panels, which is provided for dissipating the heat produced by the electrical elements of the panel.

This occurs by creating a vertical air flow, through the realization of a first opening or grid in the lower area of the panel and a second opening or grid in the higher area of the panel, so as to obtain a natural ventilation with "chimney effect".

Practically, the hot air which is generated inside the panel, as expands, becomes less dense and tends to rise upwardly, driven by the floating force; furthermore, said air, exiting from the electrical panel, draws replacement fresh air from the grid placed in the lower area of the electrical panel.

The continuous air flow produces a continuous introduction of oxygen, which constitutes the combustion means, which, together with the fuel and the heat, constitutes one of the three essential components of the "fire-triangle".

The structure of the ventilation device, according to the present invention, allows to stop the above mentioned air flow and in a short time to reduce the concentration of oxygen (which is essential for the spreading of a fire) inside the electrical panel, thus helping to stop the flame (in practice, lacking the necessary amount of oxygen to the fire development, the "fire triangle" is stopped).

Finally, still advantageously, the ventilation device according to the invention does not require any type of electrical and/or electronic power supply for its activation.

Other features and advantages of the present invention will be more clear from the following description, which refers to a preferred embodiment of the ventilation device for electrical panels of the invention, and from the enclosed drawings, in which.

Figure 1:
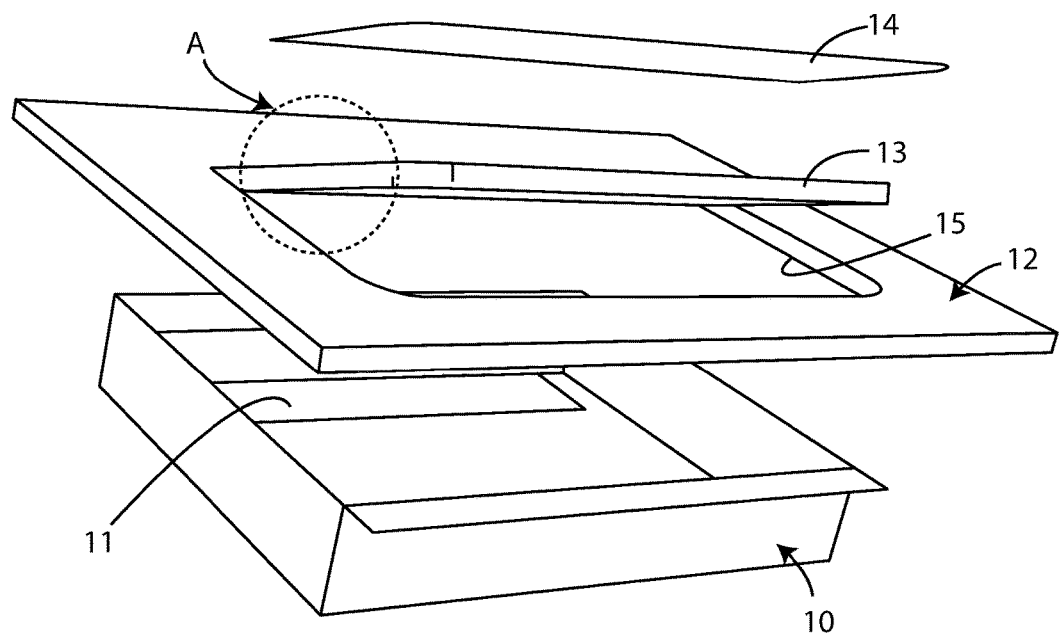
FIG. 1 shows a perspective exploded view of the ventilation device for electrical panels, according to the present invention.

With reference to the mentioned figures, the ventilation device for electrical panels, which is the object of the present invention, comprises a metal box or base 10, which has an opening or lower longitudinal grid 11, and a laminar element or sheet 12, preferably made of plastic material, such as a thermoplastic polymer, and possibly already present in the walls of the electrical panel, which is arranged above the box 10 and which has a flap 13, formed in a substantially central portion of the sheet 12. Furthermore, the flap 13 is covered, at least partially and preferably over the entire flat surface, from a metal sheet 14, which is glued on the flap 13 and which projects forwardly and laterally with respect to said flap 13; it is possible to use reinforcement layers or boxes, conductive paints or other materials performing the same function of the metal sheet 14, instead of the metal sheet 14.

It should be noted that one or more flaps 13 may be formed on the plastic sheet 12 and said flaps 13 may be of any geometric shape; in any case, each flap 13 has at least a portion of its perimeter formed in one piece with the plastic sheet 12, while the further portion is free to rise and fall with respect to said plastic sheet 12, so as to open and close the corresponding opening 15 which is thus formed on the plastic sheet 12. Said ventilation device, thus formed, constitutes a module configured to replace the classical grid of ventilation placed in the upper portion of the electrical panels and is mainly composed, as stated, by one or more flaps 13, which allow to close the opening 15 in case an excess of heat is present in the electrical panel, in order to prevent the possible ignition of fire inside the electrical panel and the possible spread of said fire outside the panel.

The optimum operating condition of the module provides that said module is installed in a horizontal position with respect to the ground.

In practice, the dissipation of the heat produced by elements placed inside the electrical panel occurs due to an air flow (indicated by the arrows F in the enclosed figures) passing through the lower opening 11 of the metal box 10 and from here through the upper opening 15 in correspondence of the lifting area of the flap 13; there is thus created a natural ventilation (a "chimney effect"), since the hot air generated inside the panel, as expands, reduces its density and tends to go upward, driven by the floating force, and then, leaving the electrical panel, draws cooler air from the opening or lower grid 11.

However, because the continuous air flow creates a continuous flow of oxygen inside the electrical panel, a possible fire ignited inside the electrical panel can be fed and spread even outside the panel.

Figure 2:
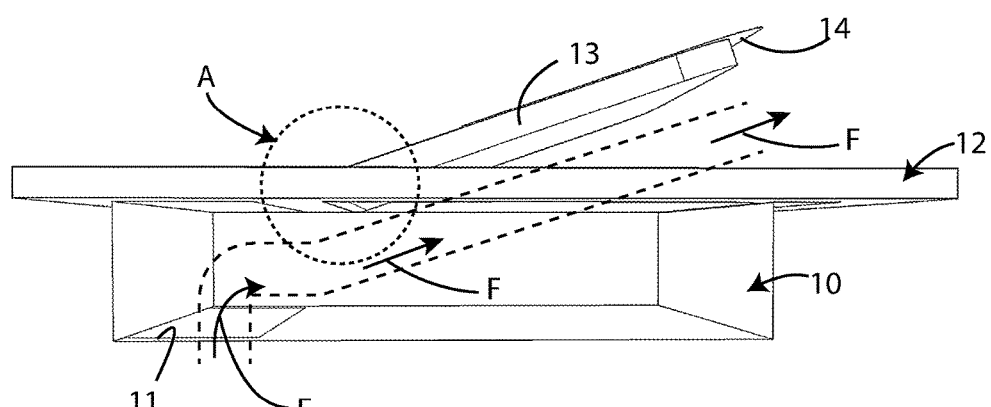
FIGS. 2 and 3 show two side perspective views of the ventilation device for electrical panels, according to the present invention.
Figure 3:
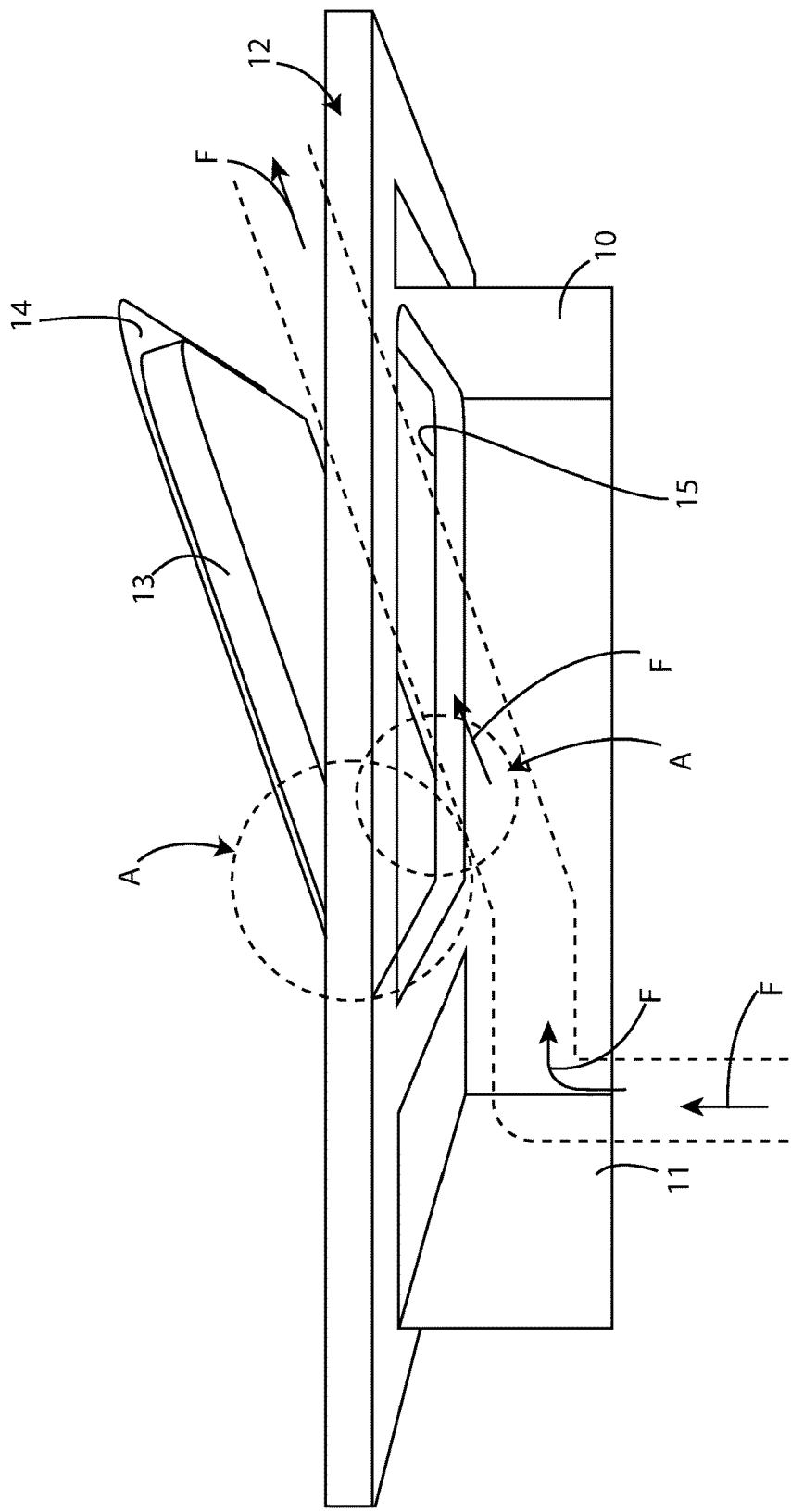
Figure 4:
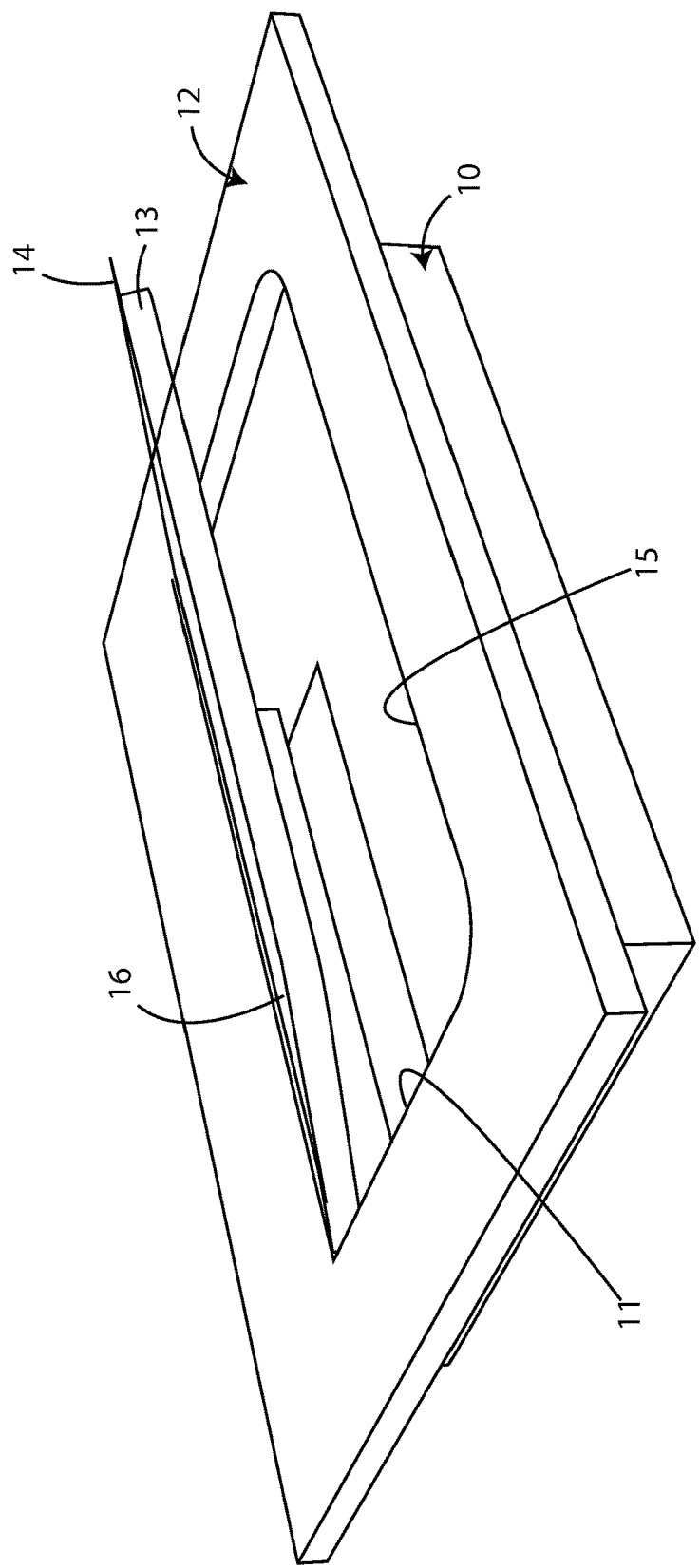
FIGS. 4 and 5 show two top perspective views of the ventilation device for electrical panels, according to the present invention.
Figure 5:
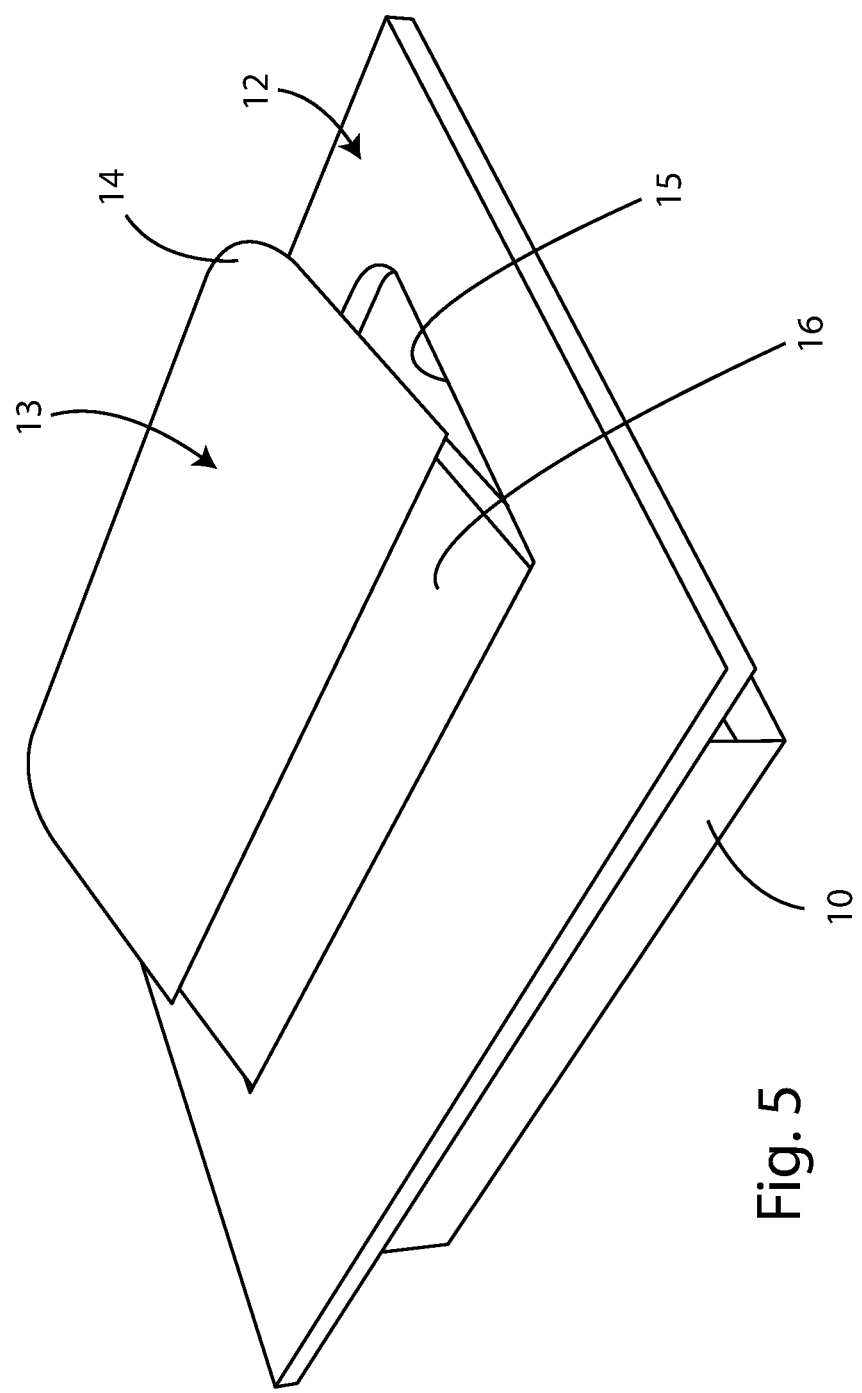

In this regard, the present invention provides that the heat flow of the flue gas (with or without flame) caused by a possible fire ignited inside the electrical panel, making a "siphon"-shaped path within the ventilation module (as shown in detail in the enclosed FIGS. 2 and 3), contacts certain "hinge" areas of the plastic sheet 12 (indicated with A in the enclosed FIGS. 1, 2 and 3) not covered by the metal sheet 14.

Said zones A heat up due to the combustion fumes and generate a sort of hinge effect in correspondence of the linear fold 16 which constitutes the perimeter line of the flap 13 integral with the plastic sheet 12.

In particular, the plastic sheet 12 (in which the permanent linear fold 16 is cold-made), when a clear increase of temperature occurs, undergoes a physical/mechanical modification and/or transformation, so that it tends to return to its initial form, thanks to the "plastic memory" (in fact, the thermoplastic polymers have the property of having a variable modulus of elasticity with temperature and, in particular, a low modulus of elasticity corresponds to high elastic properties and vice-versa; therefore, if the temperature is increased, the material becomes elastic and thus tends to return the energy stored during the deformation, thus returning to the initial equilibrium).

In practice, thanks to the elastic component of the thermoplastic material and to the energy accumulated during the transformation process of the resin and thanks to the force of gravity determined by the mass of the flap 13 with the addition of the mass of the sheet metal 14 fixed at the top, the heat generated from the combustion fumes, which are released inside the electrical panel, moves the flap 13, which closes the opening 15, thus stopping the air flow F.

Accordingly, the concentration of oxygen inside the panel decreases within a short time, thus contributing to the extinction of the flame (due to the lack of oxygen).

Furthermore, the bottom side of the flap 13, including the "hinge" areas A, is covered by a protective intumescent element to prevent that any fire passing along the air flow F is able to burn the plastic sheet 12.

One of the main feature of the ventilation device according to the invention is constituted by the fact that the flap 13 is covered at the top by a rigid metal sheet 14 (which is preferably glued on the flap 13), so that said metal sheet 14 protrudes from the three sides of the flap 13 (excluding the side corresponding to the linear fold 16 and assuming that the flap has a rectangular or square geometry) of a distance slightly greater than the length of the opening 15 closed by the flap 13 in a working condition. Moreover, the metal box 10 is made so that the heat of the fumes and/or the flame which is given off inside the electrical panel do not directly reach the surface of the plastic sheet 12 in correspondence of the areas A; the use of the metal box 10 also allows to have a siphon-shaped duct to deflect the heat flux, which thus, subsequently, is able of lapping and heating the zones A, thus causing the closing of the flap 13.

Finally, the ventilation device or module, according to the present invention, can be formed from a single plastic sheet 12 (which can be applied to the electrical panel) or by a portion of an electrical box, where the folding of the flap 13 can be made and the opening 15 can be thus obtained.

In this case, the metal box 10 is fixed on the lower side of the electrical panel and said metal box 10, in addition to make the siphon-shaped duct to direct the combustion fumes, constitutes a masking and a supporting element of the plastic zones to protect from any unwanted deformations caused by the heat (which would compromise the functionality of the hinge effect of said flap 13 and therefore the overall functionality of the device). The technical features of the ventilation device for electrical panels, which is the object of the present invention, are clear from the above description, as well as the related advantages.

Finally, it is clear that many other variations may be made to the ventilation device of the invention, without departing from the novelty principles inherent in the inventive idea as claimed in the appended claims, as well as it is clear that, in the practical embodiment, the materials, shapes and dimensions of the illustrated details can be whatever according to requirements and the same may be replaced with other technically equivalent.

The invention claimed is:

1. A ventilation device for an electrical panel, comprising a box-like metallic base, which is adapted to be placed on top of said electrical panel, said box-like metallic base having at least one lower opening through which flows a heat flow coming from said electrical panel, and at least one laminar element made of plastic that is placed above said box-like metallic base wherein said ventilation device also includes at least one flap, that is positioned in at least one portion of said laminar element, so that at least one portion of said flap is made in one piece with said laminar element and comprises a linear fold of said laminar element, suitable to allow raising and lowering of said flap with respect to said laminar element, to allow opening and closing of at least one corresponding upper opening of said laminar element, said upper opening being defined by said flap, wherein said heat flow is deflected to contact and heat said laminar element, thus causing a lowering of said flap and a consequent closure of said upper opening of said laminar element.

2. A ventilation device according to claim 1, characterized in that said flap is covered at least partially by at least one layer of material, which is attached above the flap and which protrudes in correspondence of at least one perimetric side of said flap.

3. A ventilation device according to claim 1, characterized in that said ventilation device constitutes a ventilation module configured to replace ventilation grids of the electrical panel, wherein said box-like metallic base is installed in a horizontal position with respect to the ground.

4. A ventilation device according to claim 1, characterized in that said heat flow is channeled through a sinuous path towards said upper opening of the laminar element in correspondence of at least one lifting area of said flap, said lifting area of the flap being placed at said linear fold.

5. A ventilation device according to claim 1, characterized in that said heat flow contacts prefixed areas of said laminar element which are not covered by said metal sheet, so that said prefixed areas heat up, thus producing a hinge effect in correspondence of said linear fold of the flap.

6. A ventilation device according to claim 1, characterized in that said linear fold is made without heating said laminar element.

7. A ventilation device according to claim 1, characterized in that said laminar element is made from a thermoplastic polymer.

8. A ventilation device according to claim 5, characterized in that said heat flow causes a lowering of said flap, so that said flap seals said upper opening of said laminar element, in order to reduce the concentration of oxygen inside the electrical panel and to extinguish any flames and/or fires.

9. A ventilation device according to claim 1, characterized in that said laminar element is constituted by a portion of an electrical box and in that said box-like metallic base comprise a masking and a support element of plastic zones that must be protected from any unwanted deformations caused by said heat flow.

\* \* \* \* \*